| (12) | United States Patent | (10) Patent No.: | US 9,440,405 B2 |
|---|---|---|---|
| | Matuszny et al. | (45) Date of Patent: | Sep. 13, 2016 |

(54) TIRE MARKING APPARATUS

(75) Inventors: Richard R. Matuszny, Strongsville, OH (US); Jack Perecman, Golden Valley, MN (US); Shaun Immel, Dover, OH (US); Marek J. Kos, Stow, OH (US)

(73) Assignee: Micro-Poise Measurement Systems, LLC, Streetsboro, OH (US)

( * ) Notice: Subject to any disclaimer, the term of this patent is extended or adjusted under 35 U.S.C. 154(b) by 2 days.

(21) Appl. No.: 13/576,070

(22) PCT Filed: Feb. 8, 2011

(86) PCT No.: PCT/US2011/024042
§ 371 (c)(1),
(2), (4) Date: Jul. 30, 2012

(87) PCT Pub. No.: WO2011/097621
PCT Pub. Date: Aug. 11, 2011

(65) Prior Publication Data
US 2012/0298286 A1   Nov. 29, 2012

Related U.S. Application Data

(60) Provisional application No. 61/302,363, filed on Feb. 8, 2010, provisional application No. 61/420,987, filed on Dec. 8, 2010.

(51) Int. Cl.
 *B32B 41/00* (2006.01)
 *B29D 30/06* (2006.01)
 (Continued)

(52) U.S. Cl.
 CPC ....... *B29D 30/0633* (2013.01); *B29D 30/0061* (2013.01); *B29D 2030/726* (2013.01); *B29D 2030/728* (2013.01); *B60C 13/001* (2013.04); *Y10T 156/10* (2015.01); *Y10T 156/17* (2015.01)

(58) Field of Classification Search
 CPC ..... B29C 31/008; B29C 33/14; B29C 70/68; B29D 2030/726; B29D 30/08; B29D 30/72
 USPC ............ 156/64, 110.1, 116, 130.7, 350, 378, 156/379
 See application file for complete search history.

(56) References Cited

U.S. PATENT DOCUMENTS 1,646,889 A   10/1927  Trout et al.
1,810,294 A    6/1931  Richardson
(Continued)

FOREIGN PATENT DOCUMENTS

CN   2868657 Y   2/2007
CN   2935109 Y   8/2007
(Continued)

OTHER PUBLICATIONS

EP 11 74 0525 Extended European Search Report with European Search Opinion; completed Jun. 11, 2013.
(Continued)

*Primary Examiner* — Michael N Orlando
*Assistant Examiner* — Joshel Rivera
(74) *Attorney, Agent, or Firm* — Tarolli, Sundheim, Covell & Tummino LLP

(57) ABSTRACT

A tire marking apparatus and tire marking method capable of placing multiple, differently colored marks on a tire sidewall. The apparatus includes a frame assembly that movably mounts a stamping bar assembly carrying a plurality of stamping bar elements, each stamping element selectively movable into a marking position and a plurality of tape cassettes, each of which may carry tape of a different color. Each tape cassette is selectively movable into a tire marking position. An actuator advances a portion of an aligned tape cassette towards a tire marking region on the sidewall and moves an aligned stamping element into printing contact with the tire sidewall. This movement transfers material from the tape to the tire sidewall in a pattern that corresponds to indicia defined by the stamping element. The frame assembly includes an intermediate frame that is shiftable between at least two positions.

34 Claims, 13 Drawing Sheets

(51) Int. Cl.
  *B29D 30/00* (2006.01)
  *B60C 13/00* (2006.01)
  *B29D 30/72* (2006.01)

(56) References Cited

U.S. PATENT DOCUMENTS

| | | | |
|---|---|---|---|
| 2,821,858 A | 2/1958 | King | |
| 3,062,058 A | 11/1962 | Mika et al. | |
| 3,091,970 A | 6/1963 | Lannel | |
| 5,413,652 A | 5/1995 | Bohm et al. | |
| 6,016,695 A | 1/2000 | Reynolds et al. | |
| 6,439,042 B1 | 8/2002 | Delmoro et al. | |
| 7,448,267 B2 | 11/2008 | Williams et al. | |
| 2007/0256771 A1* | 11/2007 | Balogh et al. | 152/525 |

FOREIGN PATENT DOCUMENTS

| | | |
|---|---|---|
| EP | 1167030 | 2/2002 |
| JP | 07276755 | 10/1995 |
| JP | 2002122500 | 4/2002 |
| KR | 20010076631 | 8/2001 |
| KR | 100872374 | 12/2008 |

OTHER PUBLICATIONS

International Search Report PCT/US2011/024042; completed Mar. 27, 2011, along with the Written Opinion of the International Searching Authority.
Leaflet depicting prior art "AKROMARK" marking apparatus—specifically, "AKROMARK" upper assembly and exit station with upper assembly.
Leaflet depicting prior art "Hot Stamp Marker Kit"—specifically, "Two Pin, Dual Drive, Hot Stamp Marker".
Leaflet depicting prior art marking apparatus—specifically, "Hot Stamp Markers".
Model M4 Hot Stamp Marker User Manual—Jul. 2008.
polinggroup.com webpage showing prior art Hot Stamp Marker.

* cited by examiner

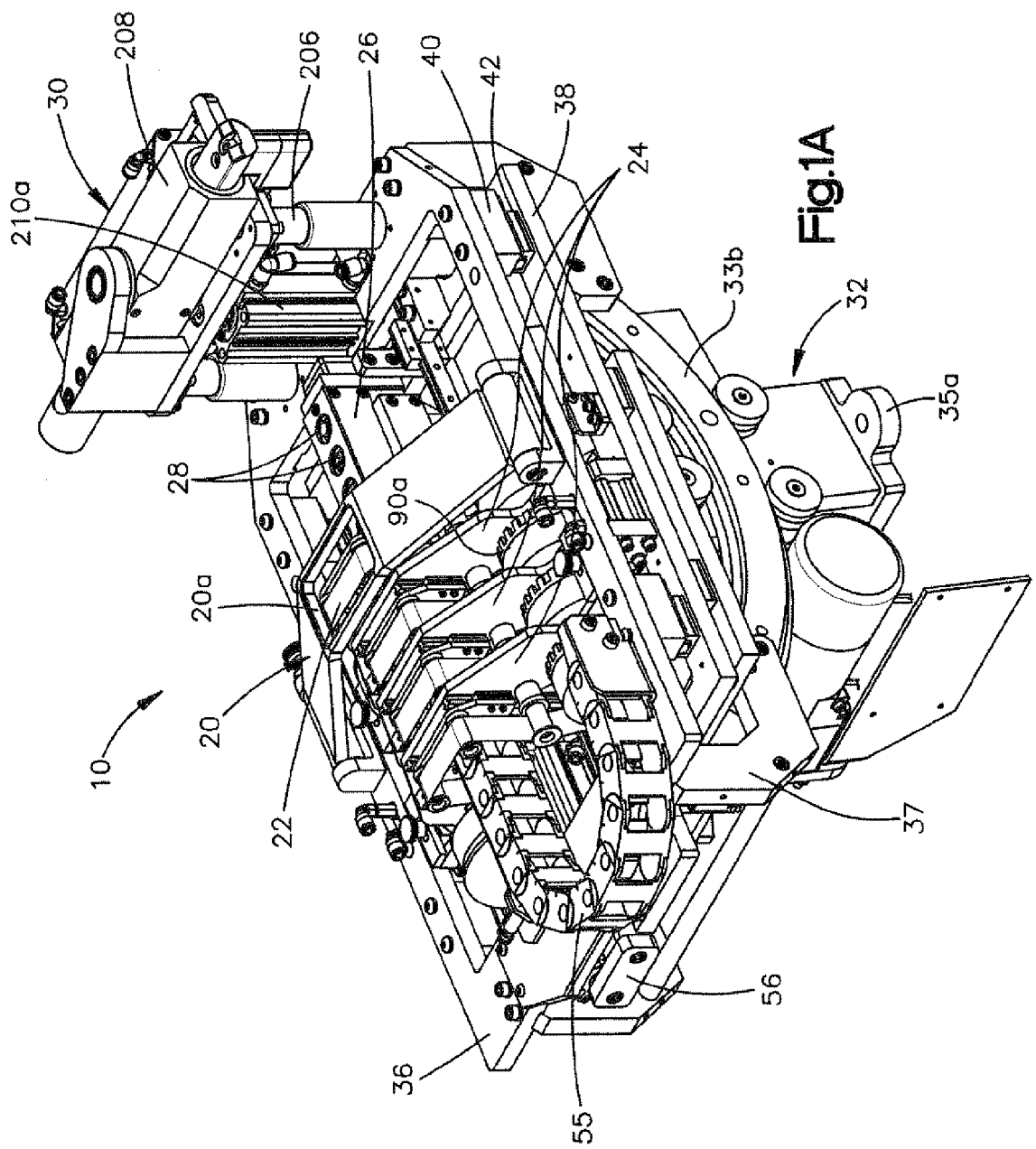

TIRE MARKING APPARATUS

RELATED APPLICATIONS

This application claims priority from U.S. Provisional Application No. 61/302,363, filed Feb. 8, 2010, and U.S. Provisional Application No. 61/420,987, filed Dec. 8, 2010, the entirety of which are incorporated herein by reference.

TECHNICAL FIELD

The present invention relates generally to tire testing and, in particular, to an apparatus and method for marking a tire with appropriate indicia after it has been tested for tire uniformity, balance, etc.

BACKGROUND ART

Tire testing systems which examine tires in order to determine the presence of any irregularities or non-uniformities are known in the art. Known systems typically move a tire to a testing station where it is engaged by some form of chuck apparatus and inflated to its normal pressure. The tire is rotated at a standard speed against a loadwheel. Data taken from load cells to which the loadwheel is attached is used to detect the presence of any irregularities which may have arisen during the manufacturing process. Additionally, the system typically measures the size of the irregularities and is equipped with devices for correcting the irregularities, for example, grinding devices which remove material from the tire. An example of a tire testing machine, known as a tire uniformity testing machine, is disclosed in U.S. Pat. No. 6,016,695, which is hereby incorporated by reference.

There are other tire testing machines that test the balance condition of a tire. An example of this type of machine is disclosed in U.S. Pat. No. 7,448,267, which is hereby incorporated by reference.

In both of these types of machines, it is often desirable to apply tire grade, balance and/or tire uniformity marks or indicia on the sidewall of the tire after testing. In the prior art, it is common to see colored dots on the sidewall of the tire that are placed there by tire marking machines. These dots are used by a tire installer to properly position the tire on a rim during tire mounting.

Recently, it has now been found desirable to mark rejected tires with multiple visible markings or codes to indicate the reason the tire failed the test.

DISCLOSURE OF INVENTION

The present invention provides a new and improved hot stamp marker and method for applying marks or other indicia to the sidewall of a tire after inspection or testing.

According to a preferred embodiment, a movable head assembly is provided which is aligned with a region on the sidewall of the tire where a mark or indicia is to be placed. An actuating mechanism selectively moves one of a plurality of marking elements into a tire marking position and advances a selected marking element towards the tire region in order to press a tape portion against the tire to place indicia thereon.

According to a preferred construction of this embodiment, at least two spaced-apart marks can be placed on the sidewall of the tire without requiring movement or positional changes of the tire. In the illustrated construction, the marking tape is carried by a tape cassette assembly and, in the preferred embodiment, the head assembly carries multiple tape cassette assemblies, each of which may carry a different colored tape. The tape cassettes are selectively movable into a printing position in order to mark a tire with indicia having a predetermined color. In the illustrated embodiment, the head assembly carries four tape cassette assemblies, each of which may provide a different colored tape.

According to a feature of the invention, multiple side-by-side marks can be placed on the tire region by shifting an intermediate frame member which carries the marking element assembly and associated tape cassette. The intermediate frame member is shiftable between two positions by at least one actuator. With the disclosed embodiment marks in a 1×2 matrix can be placed on a tire sidewall.

According to another feature of the invention, the multiple tape cassettes are carried by a sub-frame which is slidably attached to the intermediate frame and is relatively movable, whereby a selected one of a plurality of tape cassettes carried by the sub-frame can be positioned in a predetermined alignment with a marking region on the tire sidewall.

According to the illustrated embodiment, a marker assembly carries six individual markers, any one of which can be positioned in alignment with the tire region to be marked.

In the exemplary embodiment, each tape cassette includes a supply of tape, which is fed from a supply roll to a take-up roll along a path defined at least partially by guide rollers. Each tape cassette includes a fixed mounting plate, which rotatably mounts the supply roll, and a movable plate, which rotatably mounts the take-up roll. The movable plate is moved towards the sidewall of the tire to present a tape segment in close proximity to the tire sidewall. In the disclosed embodiment, the movable plate also serves a tape advancing function and, in particular, pulls tape from the supply roll as the movable plate moves towards the tire sidewall.

According to a feature of this embodiment, the supply roll includes a portion of a rotation sensor, whereby tape exhaustion or tape breakage is detected. In the illustrated embodiment, the supply roll includes a target in the form of a slotted wheel. An optical or proximity sensor focused on the wheel and carried by a head assembly frame member senses whether the supply roll rotates when the movable plate is advancing towards the tire. The absence of rotation indicates tape breakage or exhaustion.

The movable cassette plate is returned to its retracted position by a spring assembly, which also includes an adjustable stop pin. This feature allows the retracted position to be changed or adjusted in order to adjust the amount of tape pulled from the supply roll during the advancing stroke.

With the disclosed embodiment, separate drive motors and tape sensors are not needed for each tape cassette. A common sensor monitors rotation of the supply roll of the tape cassette located in the marking position. Since the tape is advanced by virtue of the advancement motion in the movable cassette plate, separate tape drive motors for each tape cassette are not needed.

According to the invention, for some applications a retractable clamp mechanism is provided in order to provide a back-up or support for the tire region being marked. In particular, a back-up clamp assembly is carried by a head assembly frame member and includes an actuator having an extendable back-up element, which can be retracted and rotated, to a position that allows a tire to be moved into or out of a marking location.

The overall head assembly is tiltable by a tilt mechanism which is configured to rotate the head about the center of a marking window. With the disclosed apparatus, tilting of the head changes the orientation (angle) of a marking window but does not substantially change the position at which a mark will be placed on the sidewall of the tire.

According to a feature of the invention, the head assembly is moved into contact with the sidewall of the tire in order to effect marking. Contact with the sidewall of the tire is detected by a sensor, which detects movement, in a spring biased window frame. Contact with the tire produces slight motion in the window frame, which, in turn, is detected by a proximity sensor that emits a control signal to stop further head assembly movement toward the sidewall of the tire.

According to the invention, a method for marking the sidewall of the tire is disclosed which includes the step of positioning a marking head assembly in predetermined alignment with the sidewall of a tire. A selected one of a plurality of tape cassettes carried by the assembly is moved into a tire marking position. A selected one of a plurality of stamping elements, that is also carried by the frame assembly, is moved into a tire marking position. To mark the tire, a tape segment carrying portion of the selected tape cassette is moved into abutting proximity with a tire marking region on the tire sidewall. A selected stamping element is then driven toward the tire marking region in order to transfer material from tape carried by the tape segment carrying portion to the tire sidewall to thereby mark the tire with indicia defined by the stamping element. The tape segment carrying portion of the tape cassette and stamping element are moved to their retracted positions.

According to a feature of this method, two adjacent marks may be placed in the tire marking region by shifting the aligned tape cassette and the aligned stamping element to a second position and again advancing the tape segment carrying portion and actuating the stamping element to place the second mark on the tire sidewall.

With the disclosed apparatus and method, at least two adjacent marks can be easily placed on the sidewall of a tire. The marks may have up to six different configurations and up to four different colors without the need for replacing components, i.e., stamping elements or tape cassettes in the marking head assembly. The disclosed invention also eliminates the need for separate drive motors and separate sensing systems for the tape cassettes.

Additional features of the invention will become apparent and a fuller understanding obtained by reading the following detailed description made with the accompanying drawings.

BRIEF DESCRIPTION OF DRAWINGS

FIG. 1A is a perspective view of a marker head assembly constructed in accordance with a preferred embodiment of the invention;

DETAILED DESCRIPTION

Figure 1B:
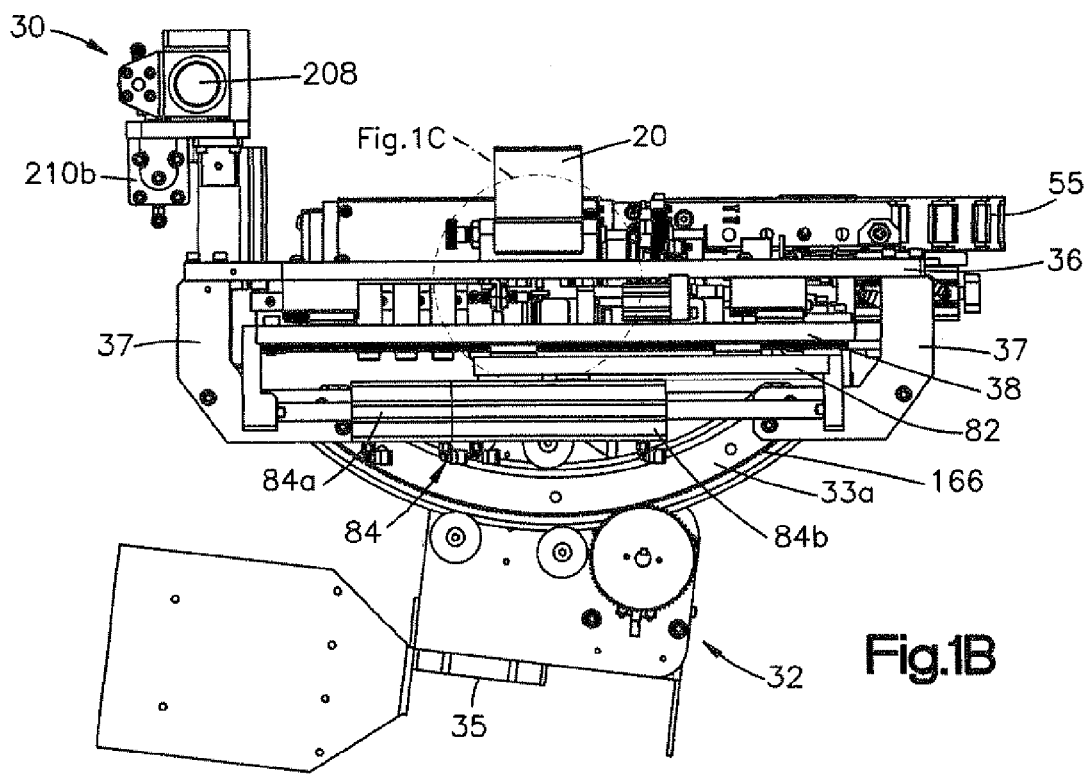
FIG. 1B is a side elevational view of the marker head shown in FIG. 1A.
Figure 1C:
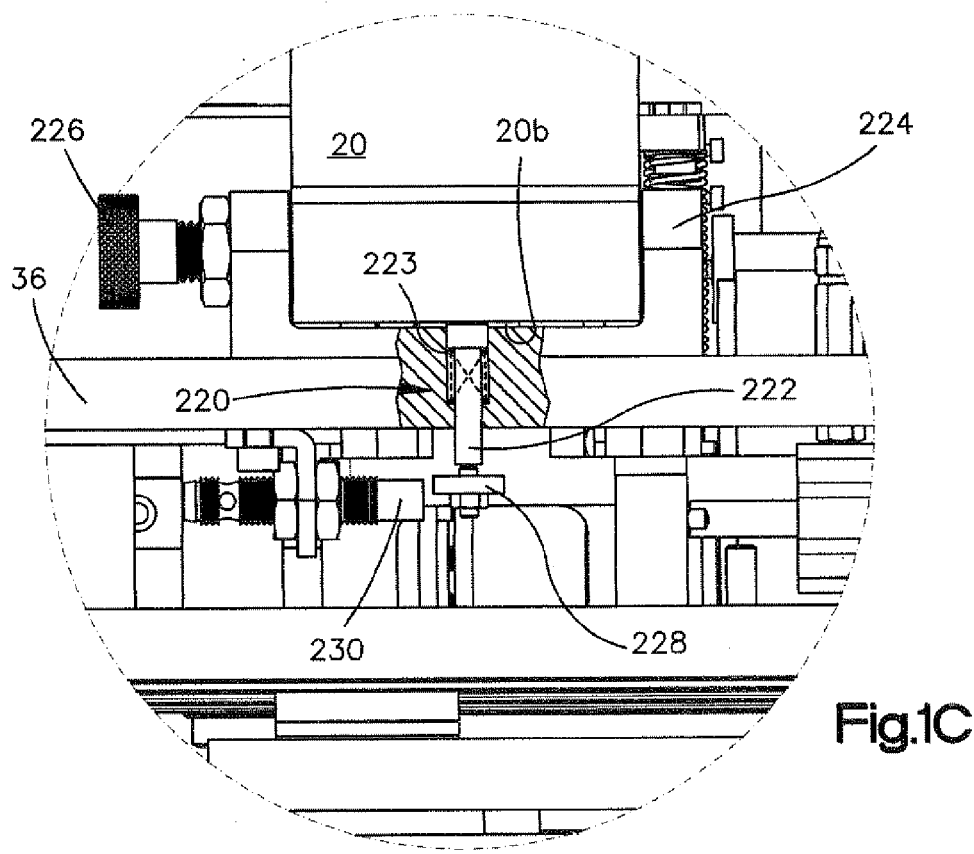
FIG. 1C is an enlarged fragmentary view as indicated by the phantom circle shown in FIG. 1B.

FIGS. 1A, 1B and 1C show the overall construction of a complete head assembly 10 of a hot stamp marking apparatus used to apply indicia to the sidewall of the tire.

The disclosed apparatus can be mounted and form part of a tire uniformity-testing system such as that disclosed in U.S. Pat. No. 6,016,695, or a tire balance testing system such as that shown in U.S. Pat. No. 7,448,267.

In operation, and as will be explained in detail, structure or frame 20 defining a printing window 20a is pressed against a predetermined location on the sidewall of the tire and defines a region on the tire which may receive a mark or marks, i.e., a dot. Thermally sensitive tape 22 carried by a tape cassette 24 (see also FIG. 7A) overlies the opening 20a and a heated stamping bar or block assembly 26 (See also FIGS. 4A and 5A), which includes a plurality of stamping bars 28, is actuated to press the tape 22 against the tire sidewall and thereby transfer material from the tape to the tire.

Figure 2A:
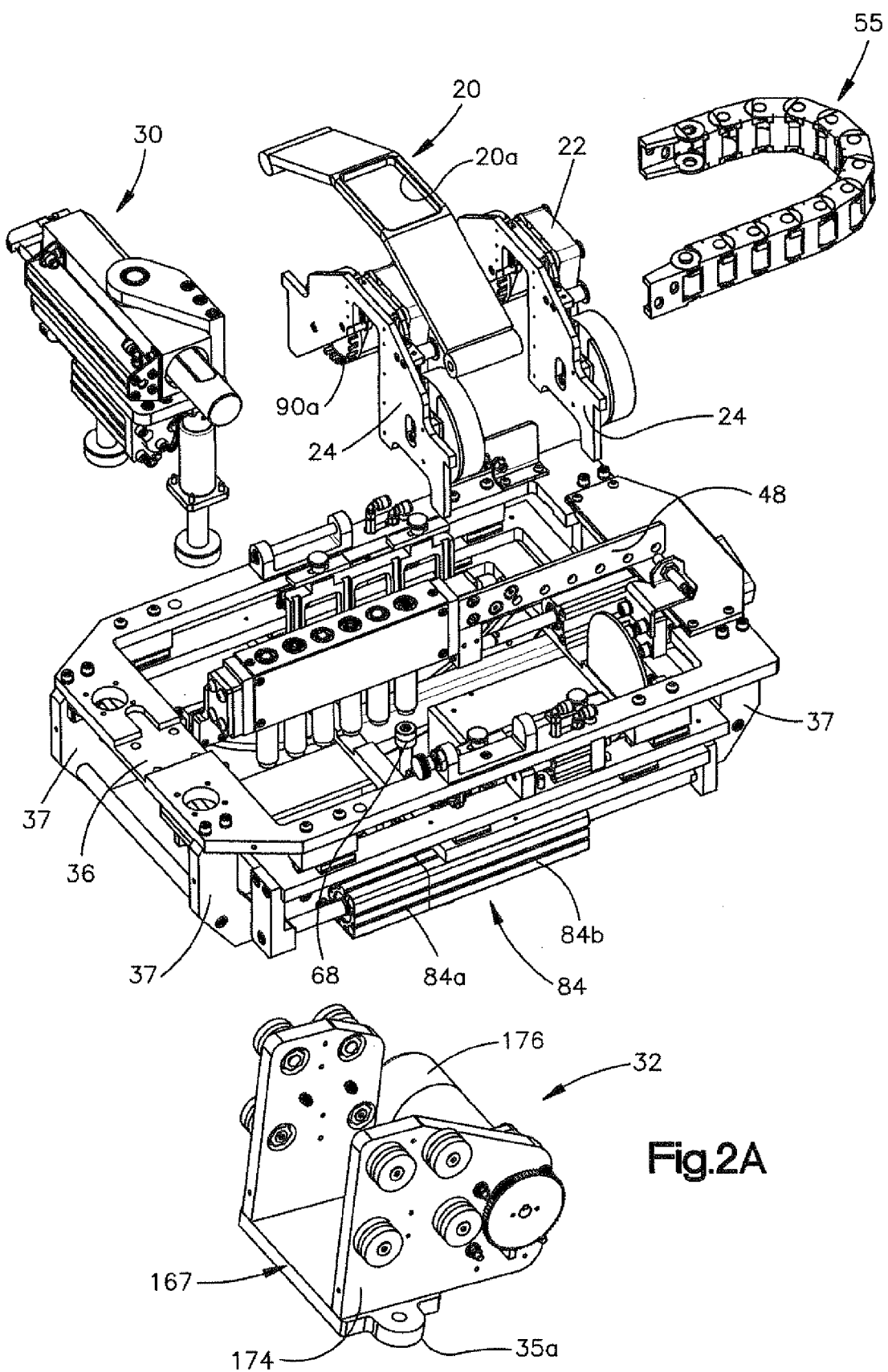
FIGS. 2A and 2B are exploded views the head assembly shown in FIGS. 1A and 1B.
Figure 2B:
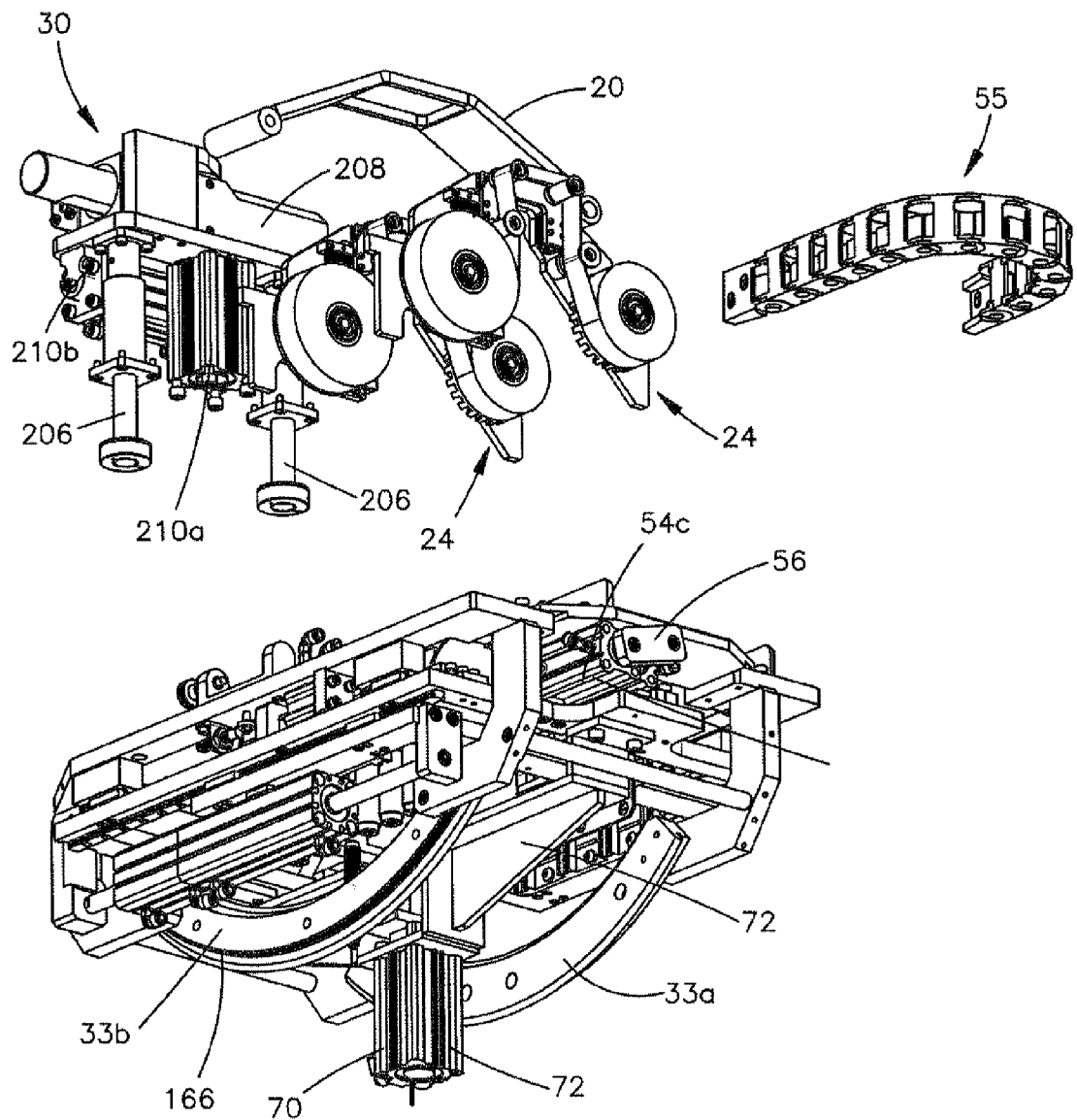
Figure 2B:
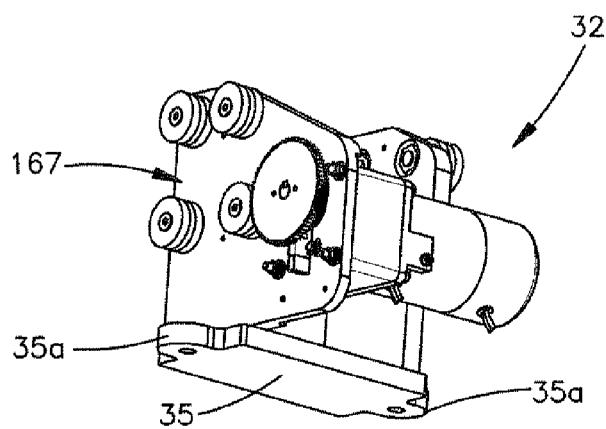

FIGS. 2A and 2B are exploded views of the head assembly 10 and, as seen best in these figures, illustrate major subassemblies including tape cassettes 24, a back-up clamp assembly 30 and a tilt mechanism 32 which engages a pair of curved tracks 33a, 33b and moves the overall head assembly 10 into a predetermined orientation with respect to a tire sidewall. As seen best in FIGS. 2A and 2B, the tilt mechanism 32 includes a base plate 35 including a pair of laterally extending ears 35a. The ears 35a are attachable to a suitable support structure (not shown) which supports the overall head assembly 10 in an operative position with respect to a tire conveyor or other apparatus for conveying tires to a marking location. The back-up clamp assembly 30, as will be explained, includes a movable back-up element that is positioned on the inside of a tire and supports a region of the tire sidewall where a mark is to be placed by the stamping bar assembly 26.

In the preferred and illustrated embodiment, the printing window 20 defines two locations on the sidewall of the tire that may receive a mark. The stamping block assembly 26 is positioned in one of the two defined locations within the window 20a and is actuated to transfer material from the tape 22 to the tire sidewall. It should be noted here that those skilled in the art will recognize that this mechanism can be modified to provide four or more marking positions so that four or more marks can be placed on a tire sidewall, if needed.

Figure 3:
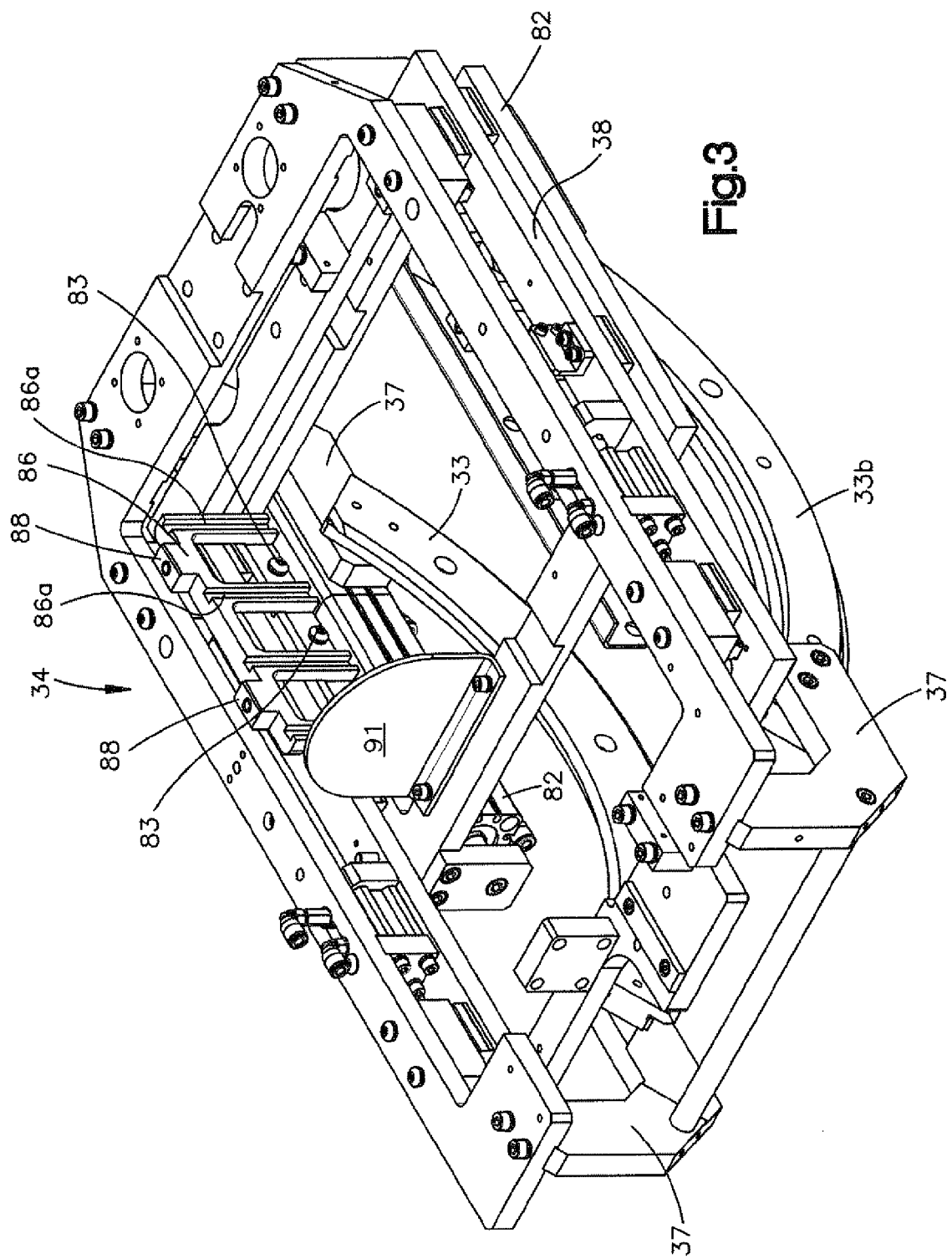
FIG. 3 is a perspective view of a frame subassembly forming part of the marker head constructed in accordance with a preferred embodiment of the invention.

Referring also to FIG. 3, a frame subassembly 34 is shown. The frame 34 includes a U-shaped fixed plate 36, which is rigidly attached to the curved tracks 33a, 33b by pairs of L-shaped brackets 37 which depend downwardly from the U-shaped plate 36. An intermediate frame plate 38 is slidably movable with respect to the fixed plate 36 and supports the stamping bar assembly 26 and associated components to be described. Rail blocks 40 and mating guides 42 (shown best in FIG. 4A) slidably support the intermediate frame plate 38 with respect to the fixed plate 36 and confine it to linear movement between two positions. The intermediate plate 38 is moved to one of two operational positions by a pair of pneumatic actuators 44 which have their cylinder ends attached to the fixed plate 36 and their rod ends attached to an abutment plate 46 that is fixed to the intermediate frame plate 38. Extension and retraction of these actuators 44 produces linear movement in the intermediate plate 38 between two positions.

Figure 4A:
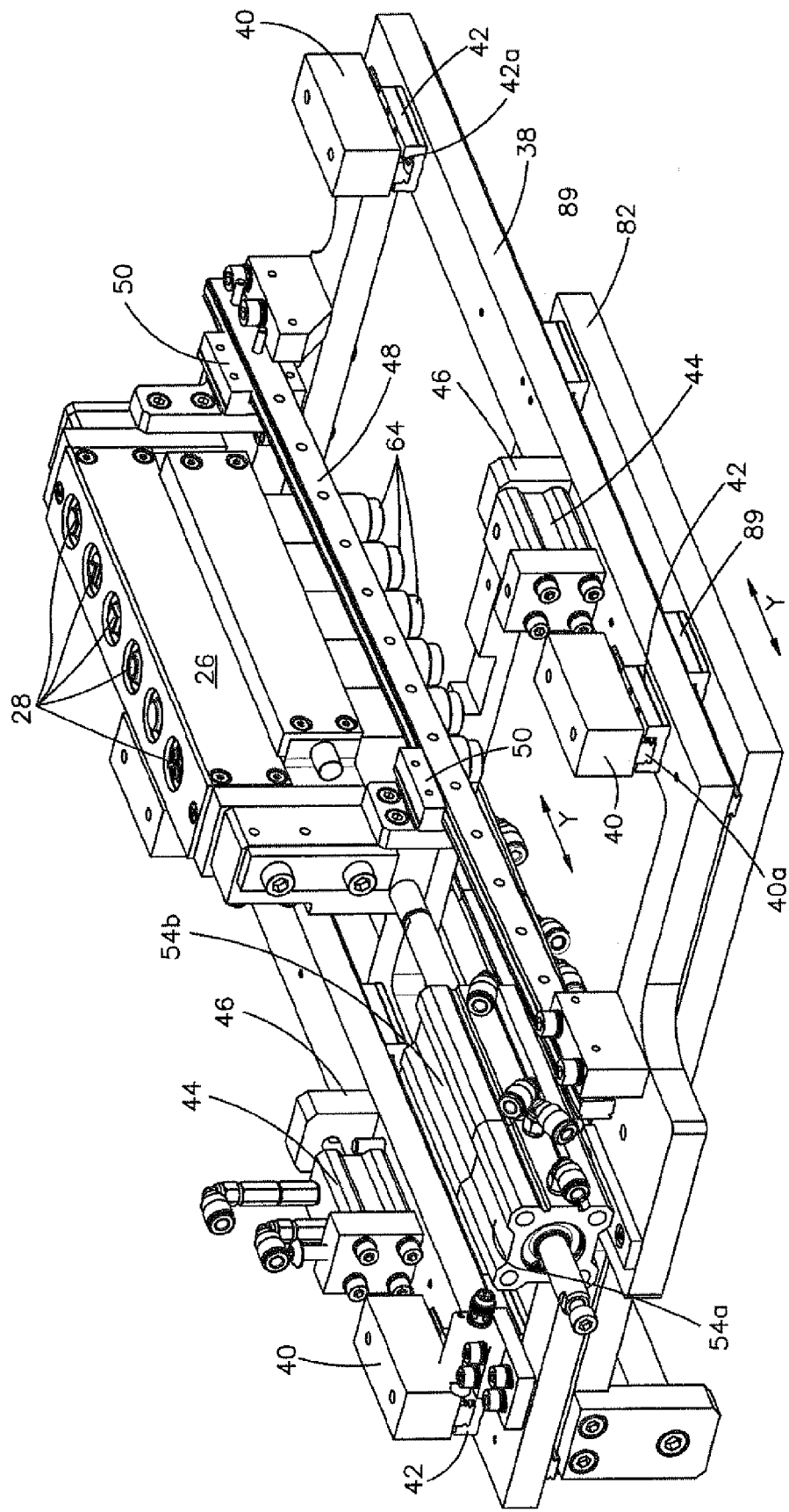
FIGS. 4A and 4B are perspective views of a portion of the frame subassembly shown in FIG. 3.
Figure 4C:
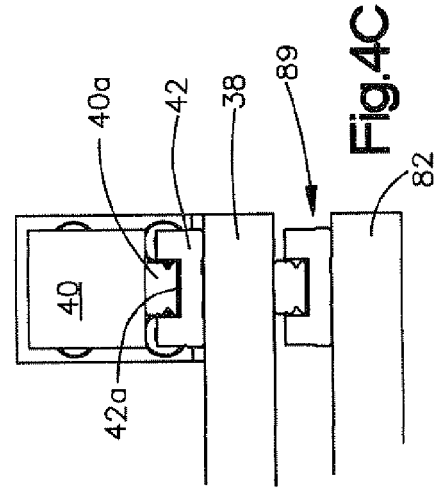
FIG. 4C is an enlarged fragmentary view of rail bearing/guide elements forming part of the frame sub-assembly shown in FIGS. 4A and 4B.
Figure 5A:
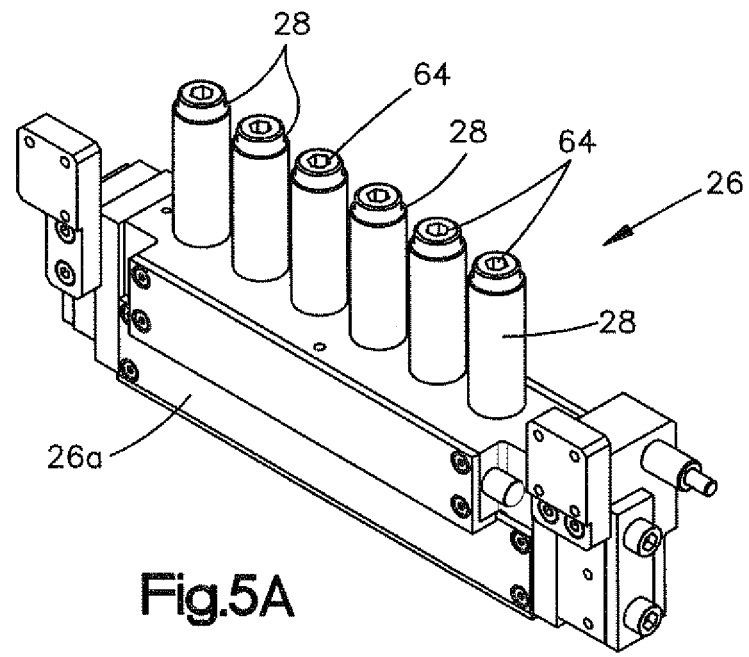
FIG. 5A is a perspective view of a stamping bar assembly constructed in accordance with a preferred embodiment of the invention.
Figure 5B:
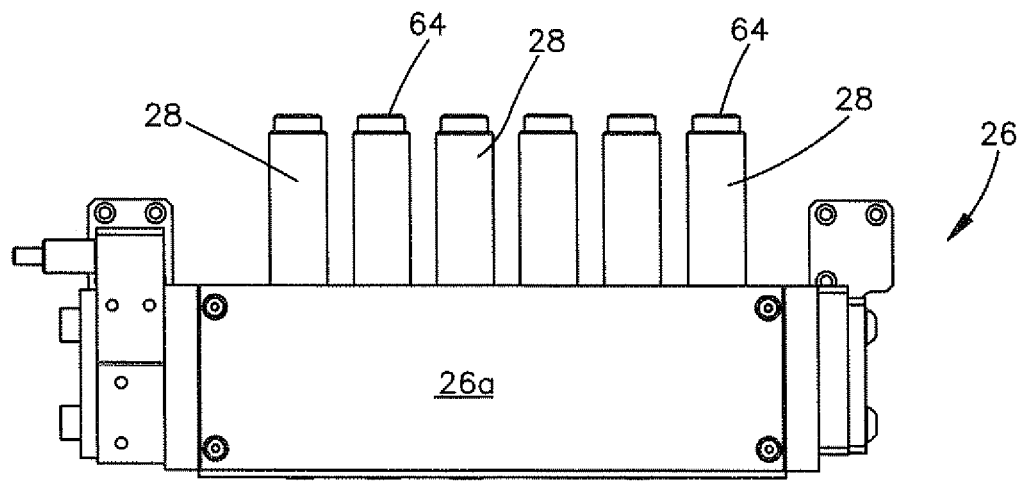
FIG. 5B is a side elevational view of the stamping bar assembly shown in FIG. 5A.
Figure 5C:
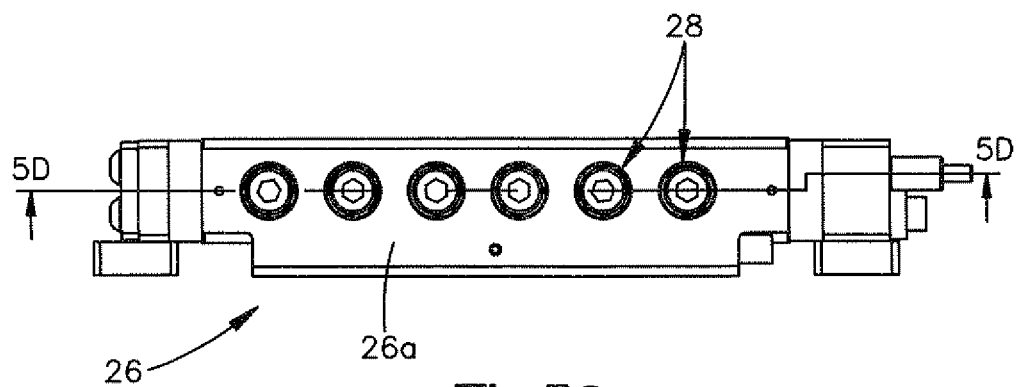
FIG. 5C is a top plan view of the stamping bar assembly.

The controlled linear movement of the intermediate plate 38 with respect to the fixed plate 36 is provided by the rail bearings/guides 40, 42, the construction of which is best shown in FIG. 4A. As seen in FIG. 4A, each rail bearing includes the rail block 40 suitably attached to the underside of the rigid frame 36. Referring also to FIG. 4C, the block 40 includes a dove tail-shaped rail 40a, which is captured, but slidable, in the receiving guide 42 attached to the intermediate frame plate 38 and which defines a complementally shaped dove tail slot 42a. As seen in FIGS. 4A and 4C, four such block/rail assemblies attach the intermediate frame plate 38 to the fixed plate 36 and allow confined linear motion between the plates 36, 38, the positioning being controlled by the pair of actuators 44. Block/rail assemblies of the type illustrated in FIG. 4A are available from Bosch Rexroth and may be termed "profiled rail bearings".

It should be noted here that if only a single marking position on the tire is desired, the intermediate frame 38 would not need to be mounted for relative movement with respect to the fixed frame 36. Accordingly, the intermediate plate 38 would be rigidly mounted to the fixed plate 36 (or eliminated). The rail bearings/guides 40, 42 and actuators 44 would also be eliminated.

Figure 4B:
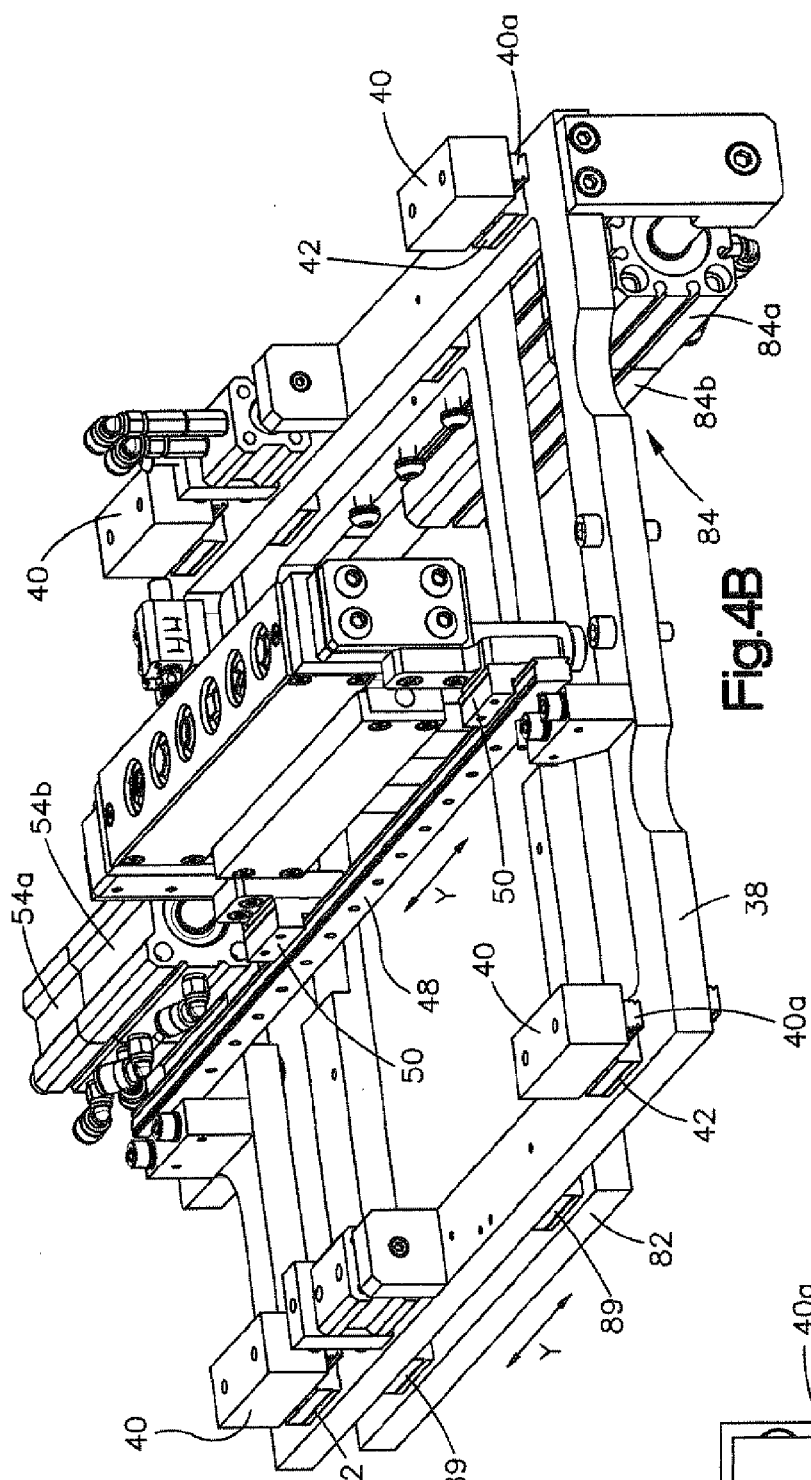

Referring also to FIGS. 4A and 4B, the intermediate frame plate 38 mounts the heated stamping bar block or assembly 26. As seen best in FIG. 4A, the stamping block 26 is mounted for relative linear movement with respect to the intermediate frame plate 38 and, in particular, is guided for linear movement by a bearing track 48 mounted to the intermediate frame plate 38 which is slidably engaged by a pair of guide blocks 50 attached to the stamping bar assembly 26. In the illustrated embodiment, the stamping block assembly includes six (6) individually actuatable stamping bars or markers 28.

A suitable actuator, which may comprise a plurality of three serially connected fluid pressure operated (i.e., pneumatic) actuators, are selectively actuated in order to slide the stamping bar assembly 26 along the track 48 and thus position a selected one of the markers 28 below the printing window 20.

In the preferred and illustrated embodiment, the positioning of the stamping block assembly 26 within the window 20 is controlled by three serially connected actuators 54a, 54b, 54c. The actuators 54a, 54b are joined back to back and form a unitary actuator assembly capable of moving the stamping block 26 into one of four positions The actuator 54c is coupled by a cross plate 56 (shown in FIG. 2B) to the unitary actuator assembly formed by the actuators 54a, 54b. The actuation of the actuator 54c moves the combined/joined actuator 54a, 54b to one of two positions, thus adding to more possible positions for the stamping bar assembly within the window 20. In particular and as illustrated, the cylinder 54c is a 50 mm stroke cylinder and the joined cylinders 54a, 54b is actually a double cylinder assembly consisting of a 50 mm stroke and a 25 mm stroke cylinder mounted back-to-back. This combination of cylinders provides at least six discreet positions for the stamping/heater mechanism 26. The cabling and fluid pressure (pneumatic) lines for the stamping bar block 26 are confined and protected by a flexible chain-like conduit that is indicated by the reference character 55. As indicated above, selective actuation of the actuators 54a, 54b, 54c provides at least six discreet positions for the stamping bar assembly and, hence, any one of the six stamping bars 28 may be moved to an operative position within the stamping window 20.

Referring now to FIGS. 4A and 5A-5D, details of the stamping bar assembly/block 26 are shown. The assembly includes a thermal conducting block 26a, which supports the plurality of individual stamping bars 28. In the illustrated embodiment, six stamping bars 28 are supported, each bar capable of stamping a uniquely shaped indicia on the sidewall of the tire. Although each stamping bar 28 may have an associated cable heater for heating the stamping bar, in the preferred embodiment, the block 26a, which supports the stamping bars is heated and this heat is transmitted to the individual stamping bars 28.

Figure 5D:
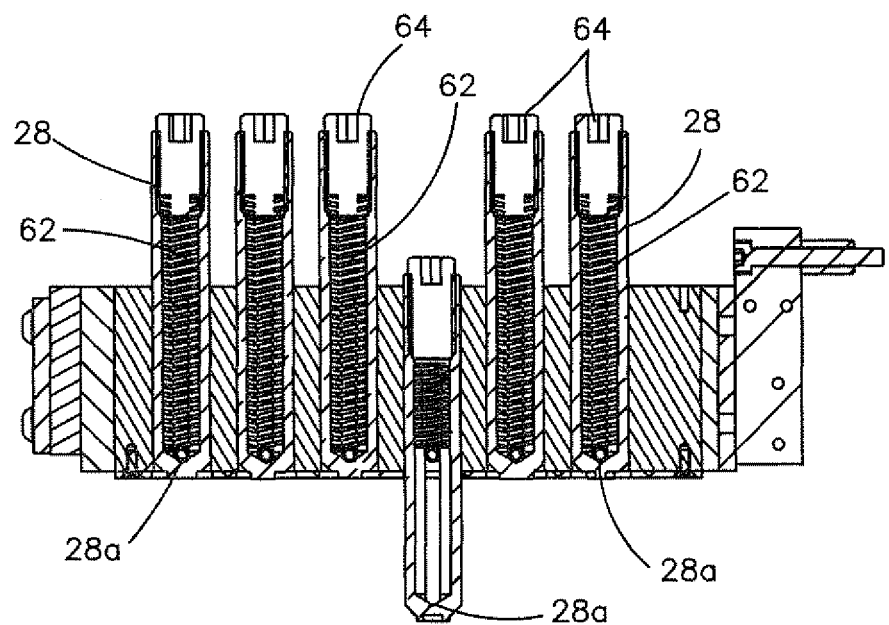
FIG. 5D is a sectional view of the stamping bar assembly.

As seen best in FIG. 5D, each stamping bar 28 is supported in a bore 60 (which may be sleeved with a bearing material) and includes a retraction spring 62 for urging the associated stamping bar 28 away from the tire sidewall. Each stamping bar includes a head or button 64, which is contacted by a plunger 68 (FIG. 2A) of an actuator or applying cylinder 70 (shown best id FIG. 2B), which drives a suitably positioned heated stamping bar towards the tire sidewall and, in so doing, presses the thermal tape 22 against the sidewall. The heat of the stamping bar 28 effects the transfer of material from the thermally-sensitive tape 22 to the sidewall, the material being in the shape defined by the confronting face 28a of the actuated stamping bar. As indicated above, each stamping bar may include a different shape configuration at its confronting end 28a, so that indicia in any one of six shapes can be applied to the sidewall of the tire.

Referring to FIG. 4A and as explained earlier, the stamping/heater mechanism 26 is incrementally movable, in the "Y" direction; within the intermediate frame 38 in order to position any one of the six stamping bars 28 in alignment with the window 20. As also explained above, the intermediate frame itself is also incrementally movable (by the actuators 44) in the "Y" direction i.e. in a direction that is parallel to the direction of motion of the stamping/heater mechanism 26. In the illustrated embodiment, the intermediate frame 38 is movable between two positions. With the disclosed mechanism, two different spaced-apart marks can be made on the sidewall of a tire without requiring movement of the overall head assembly.

Figure 6:
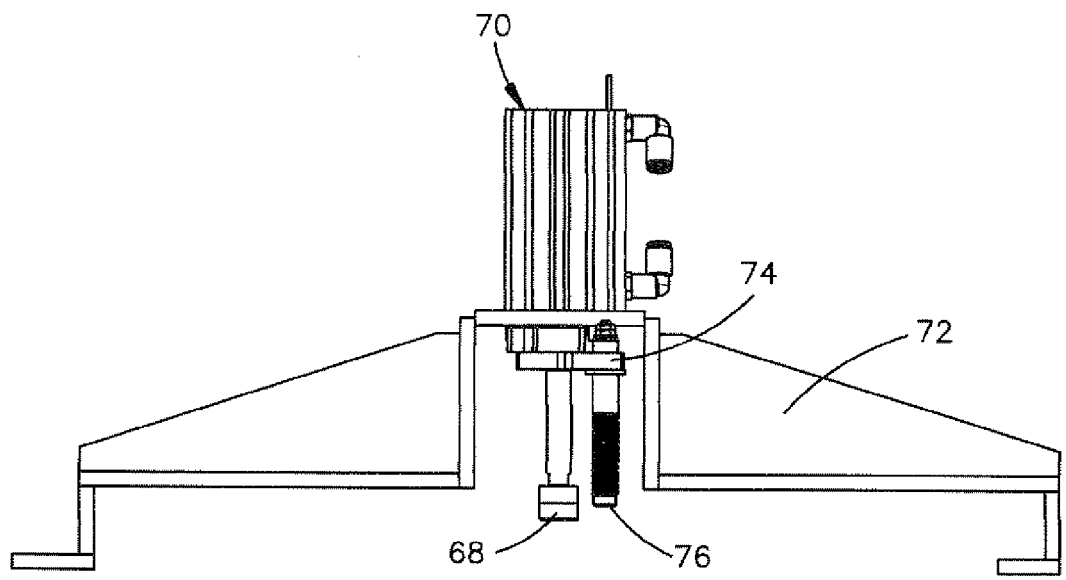
FIG. 6 is an elevational view of a mark applying apparatus forming part of the head assembly shown in FIG. 1A constructed in accordance with a preferred embodiment of the invention.

The mechanism for effecting the movement in a stamping bar to thereby mark of the tire is best shown in FIGS. 2B and 6. The apparatus includes the fluid pressure operated actuator 70, which is mounted in a V-shaped mount 72. The mount 72 is attached to the underside of the intermediate frame 38 and thus moves with the intermediate frame 38 when the frame is shifted between its two operative positions by the actuators 44. The actuator 70 includes a pusher plate 74 that is operatively connected to the rod end of the cylinder 70. The pusher plate 74 mounts the stamping bar plunger/pusher 68 and a spring-loaded tape deck advancing pusher stud 76. The operation of the pusher plate 74 will be further described in connection with the description of the tape cassette 24.

Figure 7A:
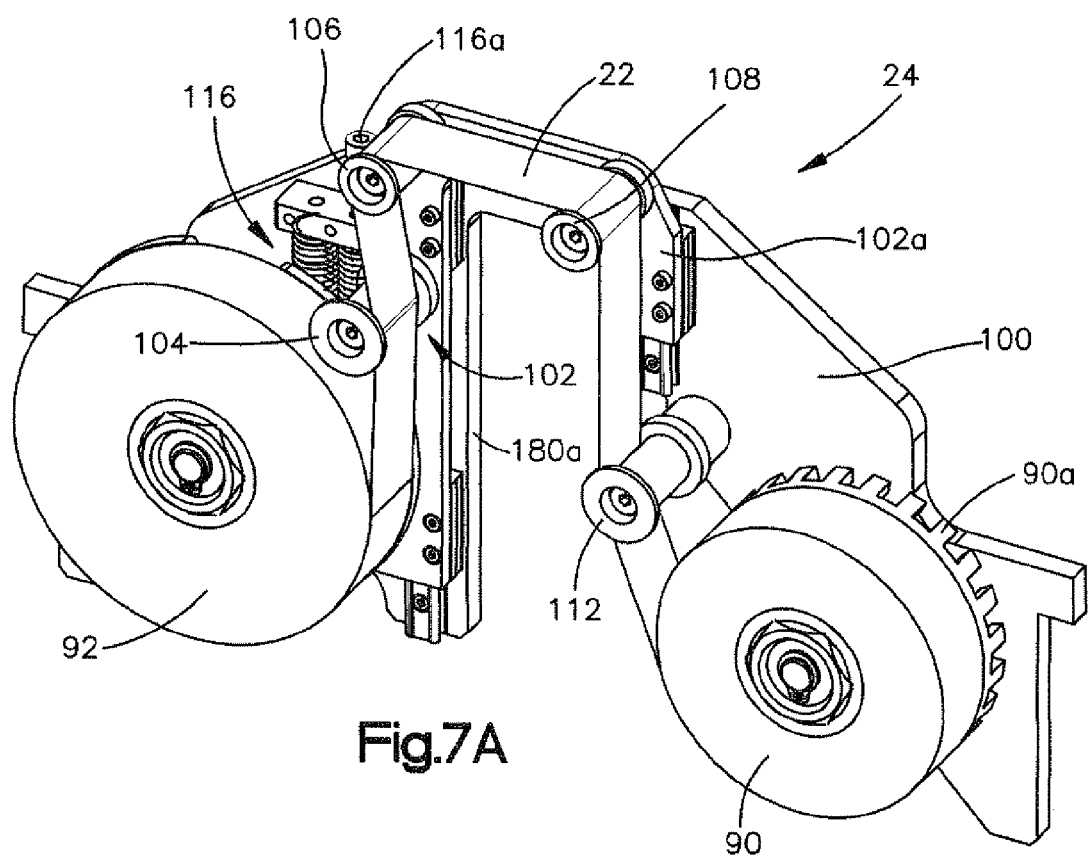
FIG. 7A is perspective view of a tape deck constructed in accordance with a preferred embodiment of the invention.

Turning now to FIG. 7A, a tape deck or cassette 24 forming part of the invention is shown. In the preferred and illustrated embodiment, the head assembly 10 includes the capability of using multiple colors for the indicia transferred to the tire sidewall. To achieve this feature, provision is made for removably mounting four individual tape decks 24 to a slidably moveable sub-frame 82, each tape deck having a different color tape. In the preferred embodiment and as seen in FIGS. 1A, 2A and 2B four (4) tape decks are removably mounted in the head assembly. As will be explained, the tape decks 24 are selectively moveable into an operative position below the window 20 by a fluid pressure operated actuator 84 (see FIGS. 1B and 2A).

Referring also to FIG. 3, the tape decks are removably held to the sub-frame 82 by a pair of brackets 86 best shown in FIG. 3. Each bracket 86 is suitably attached to an inside surface of the sub-frame 82 by fasteners 83. Each bracket 86 includes four tape deck mounting slots 86a, which slidably receive edge structure on an associated tape cassette. A given tape cassette is suspended between associated aligned slots 86a on the brackets 86. Each bracket includes a pair of threaded mounting blocks 88 (shown in FIG. 3) which receive suitably slotted retaining clips (not shown), which hold down a tape cassette once mounted. The retaining clips are held to their respective blocks 88, preferably by thumb screws which are easily removable, in order to move the retaining clip and remove a tape cassette.

Referring to FIGS. 1B, 2A, 4A and 4B, the removable tape decks 24 are held in the deck sub-frame 82 that is relatively moveable in the "Y" direction with respect to the intermediate frame 38 (the "Y" direction is indicated in FIGS. 4A and 4B). The tape deck sub-frame 82 is movable to one of four positions with respect to the stamping window 20 by the tape deck indexing cylinder assembly 84. The sub-frame 82 is moveably coupled to the intermediate frame 38 by four (4) block/rail assemblies 89 that are substantially similar the block/rail assemblies 40, 42 described above in connection with the intermediate frame 38 and are shown best in FIG. 4C.

In the preferred embodiment, the cylinder assembly 84 comprises serially connected actuators 84a, 84b with one actuator of the pair having twice the stroke of its companion actuator. With this arrangement, a first tape deck is positioned in an operative position when both actuators of the pair are retracted. To move a second deck into operative position, the actuator with the shorter stroke is energized. To move the third tape deck into its operative position, the short stroke actuator is deactivated and the long stroke actuator is energized. To move a fourth deck into position, the short stroke actuator and the long stroke actuator are both actuated (pressurized).

Figure 7B:
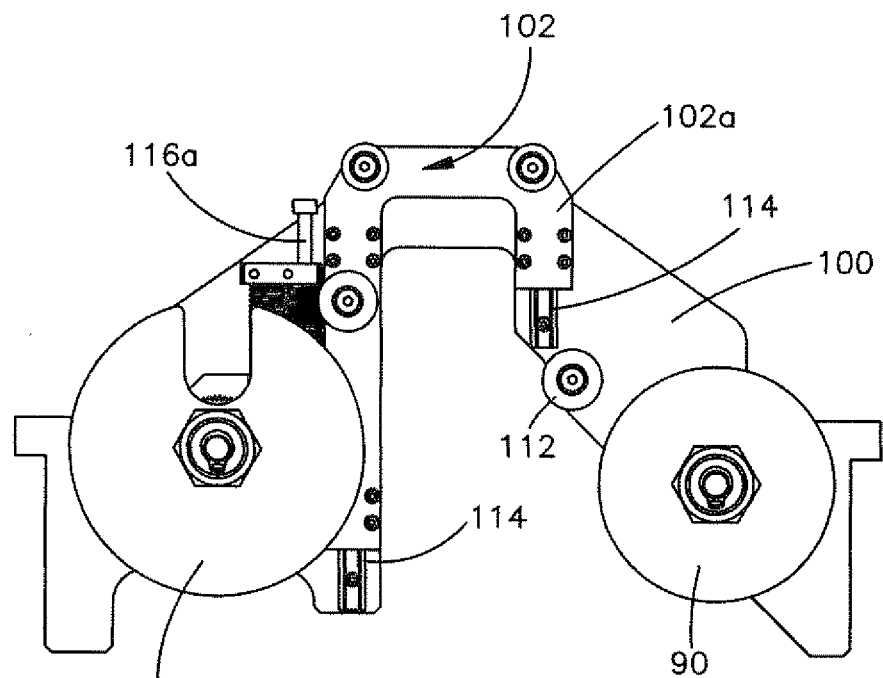
FIG. 7B is a side elevational view of the tape deck shown in FIG. 7A.
Figure 7C:
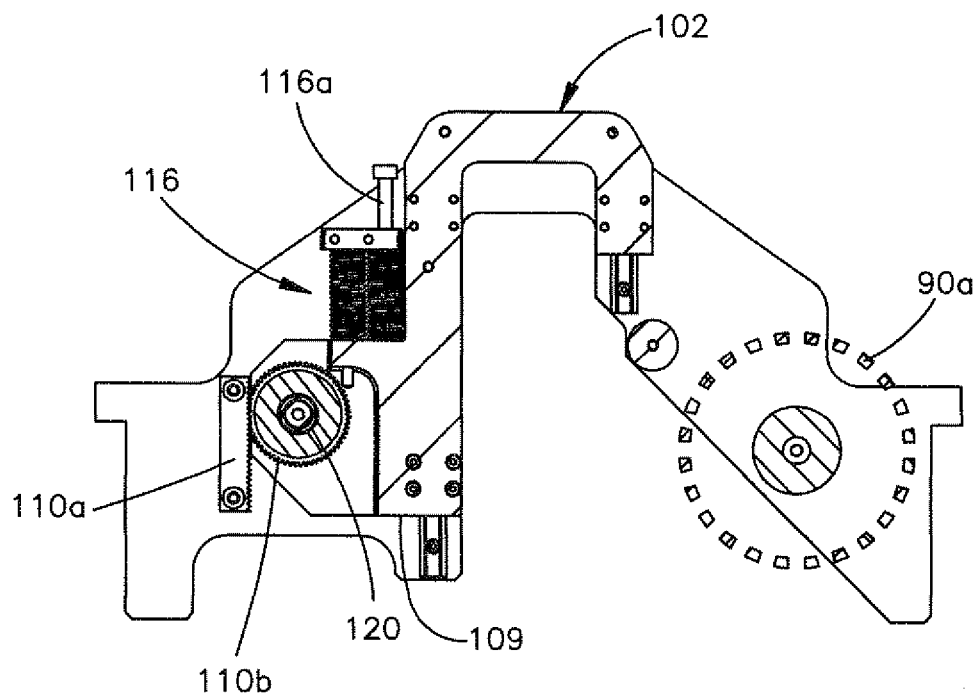
FIG. 7C is a partially sectional view of the tape deck shown in FIG. 7A.

The construction of the tape deck or cassette subassembly 24 is shown in FIGS. 7A-7C. In operation, the thermally sensitive tape 22 is fed across the print window 20 from a supply spool 90 to a rewind or take-up spool 92. In the illustrated embodiment, the tape deck 24 includes a fixed deck plate 100 that slidably supports a spring-loaded [tape guide plate 102 to which tape guide rollers 104, 106 and 108 are attached. The tape guide plate 102 is reciprocally movable towards and away from the window 20' and forms part of the mechanism to advance the thermal tape 22 from the supply roll 90 to the take-up roll 92. The tape guide plate 102 is J-shaped, the short length of the "J" 102a providing clearance for a fixed guide roller 112 that is attached to the fixed mounting plate 100. The tape guide plate 102 includes structure that is contacted by the spring loaded pusher stud 76 that is attached to the pusher plate 74 described earlier and shown in FIG. 6.

In particular, and referring to FIGS. 6 and 7C, when a given tape deck is in its operative position and aligned with the window 20, the spring loaded stud 76 is aligned with and is abutably engageable with an edge portion 109 of the J plate 102. Accordingly, and referring to FIG. 6, when the actuator 70 is energized, the spring-loaded stud 76 moves into contact with the J-plate portion 109 causing the plate 102 to move towards the tire until it reaches its fully extended position, at which point, further movement of the stud 76 is inhibited. Since it is spring loaded, however, the pusher plate 74 can continue to advance toward the tire, thus causing the stamping bar plunger 68 to contact and move an aligned stamping element 28 into contact with the tape/tire, whereby a mark is placed on the sidewall of the tire.

The movable tape guide plate 102 is guided for reciprocal movement by tracks 114 and is urged, to its retracted position, by a spring assembly indicated by the reference character 116 and which is also guided by an adjustable stop pin indicated by the reference character 116a and which forms part of the tape advancing mechanism (to be described). Reciprocal movement in the tape guide plate 102 not only moves the tape 22 into contact (or close proximity) with the tire, but also advances tape from the dispensing spool 90 to the take-up spool 92.

Referring to FIG. 3, a tape shield/guide 91, attached to a cross member forming part of the sub-frame 82, abuts the take-up roll 92 of the leftmost tape cassette (as viewed in FIG. 3) to help maintain and control the wind-up of used tape and inhibit the tape from falling off the spool. The take-up spools of the other tape cassettes abut the fixed mounting plate 100 of an adjacent cassette which acts as a tape shield/guide.

The tape advancing mechanism forming part of the tape cassette assembly shown in FIGS. 7A and 7C is functionally different from at least some prior art tape advancing mechanisms. In the mechanism illustrated in FIG. 7A, the tape is advanced from the supply spool 90 to the take-up spool 92 upon the return stroke of the J-plate 102 rather than its advancing stroke. In other words, when the J-plate 102 is advancing towards the tire, fresh tape is not being moved across the printing window 20. The tape is actually moved after printing is completed and as the J-plate 102 returns to its starting position.

Referring to FIGS. 7A-7C, in order to achieve this function, the supply spool 90 is attached to the non-moving plate portion 100. In addition, the roller guide 112, which initially receives tape from the supply spool 90 is also attached to the fixed plate 100 and does not translate during the printing cycle. The guide rollers 104, 106 and 108, as well as the take-up spool 92 are all attached to the movable J-plate 102 and move towards and away from the tire during a printing cycle.

The take-up spool mechanism includes a one-way clutch 120 (FIG. 7C) for inhibiting reverse rotation of the take-up spool 92 and each spool mechanism also includes a slip clutch to allow slippage of the spools, as will be explained. The one-way clutch 120 inhibits counterclockwise rotation of the take-up spool 92 to prevent tape from "unwinding" from the take-up spool. The supply spool 90 includes a slip clutch that resists rotation in either direction (but does allow rotation if sufficient force is applied).

The tape advancing mechanism operates as follows. When the printing cycle is initiated, the actuating cylinder 70 (FIG. 6) advances the J-plate 182 towards the tire. As it moves towards the tire, tape is pulled only from the supply reel 90 because the one-way clutch prevents counterclockwise rotation of the take-up spool 92. It should be understood that as the J-plate 182 moves towards the tire, the length of the path between the guide roller 108 and the fixed guide roller 112 increases and, although this movement forces tape 22 to be dispensed from the supply roll 90, the tape itself does not move across the window 20.

After the mark is placed on the tire, the return spring assembly 116 moves the J-plate 182 to its retracted position. As the J-plate 102 moves to its retracted position, the take-up spool 92 is rotated in the clockwise direction (as viewed in 7C) by a rack 110a that is attached to the fixed plate 100 and drivingly engages a gear wheel 110b forming part of the take-up spool mechanism. The gear wheel 110b is coupled to the take-up spool 92 through a slip clutch (not shown). The rack 110a causes rotation in the take-up spool as the take-up spool 92 moves along the rack 110a. For the tape advancing mechanism to function properly the resistance to tape movement exerted by the slip clutch (or brake) on the supply roll 90 (and possibly in combination with the resistance to tape movement posed by the various rollers) must exceed the resistance to rotation exerted on the take-up spool 92 by its associated slip clutch. This is necessary in order to inhibit additional tape from being pulled from the supply spool 92 as the J-plate 102 moves to its retracted position i.e. allows the gearwheel 110b' to rotate independently of the now stationary take-up spool 92 once the predetermined length of spent tape is wound onto the spool.

As noted above, a predetermined length of tape is pulled from the supply spool 90 as the J-plate 102 moves towards the sidewall of the tire. The distance that the J-plate 102 moves determines the length of fresh tape that is pulled from the supply roll 90 and this length is independent of the amount of tape on the supply spool 90 or on the take-up spool 92.

The length of fresh tape that is pulled from the supply roll 90 during the advance stroke of the J-plate 102 is adjustable. As indicated above, the retracting mechanism of the J-plate 102 includes a stop pin 116a (see FIG. 7C). This adjustable stop controls the retracted position of the J-plate 102. Since the amount of tape pulled from the supply roll is determined by the extent of travel of the J-plate 102, by adjusting its initial position using the stop screw 116a, the amount of tape pulled from the supply roll 90 during the advancing stroke can be changed to a desired amount.

A tape sensing mechanism is also provided for sensing when a tape 22 breaks or when the supply spool 90 is exhausted. In particular, the supply spool includes a slotted wheel 90a shown in FIGS. 1A, 7A and 7B. An optical sensor or proximity switch indicated generally by the reference character 109 is mounted to the intermediate frame plate 38 (the bracket for the sensor is shown in FIG. 1A). The sensor monitors rotation of the slotted disk 90a during the advancing stroke of the J-plate 102. If the sensor does not sense rotation of the slotted wheel 90a during the advancing stroke, it is an indication that either the tape is broken or the supply is exhausted and the operator is suitably signaled.

In order to minimize the quantity of tape used, it is important that only the tape pulled from the supply spool 90 during the advancing movement of the J-plate 102 be wound onto the take-up spool 92 during the retract stroke. It should be recognized that, as the take-up spool 92 fills with the spent tape, the force exerted on the tape being pulled changes as the radius of the spent tape increases. In order to ensure that additional tape is not pulled from the supply spool 90 during the return stroke, the slip clutch/brake forming part of the supply spool 90 must exert a resistance force that is greater than the pulling force exerted by the take-up spool 92, regardless of how much spent tape is wound onto the spool 92.

The mark applying actuator 70 (shown in FIGS. 2B and 6) is rigidly mounted to the intermediate frame 38 by the V-shaped support member 72. As explained above, the applying actuator 70 is operative to move the tape guide plate 102 towards the tire sidewall until the guide rollers 106, 108 contact the tire sidewall. Continued movement of the pusher plate 74 then causes to plunger 68 to contact and then move a stamp bar 28 into contact with the thermally sensitive tape 22 and then the tire in order to transfer material from the tape to the sidewall. It should be noted that the tape deck pusher stud 76 (FIG. 6) is spring-loaded and can therefore move relative to the pusher plate 74. This allows relative movement between the pusher plate 74 and the J shaped tape guide plate 102 once the spring pressure is overcome. When the applying cylinder 70 is fully extended the force applied to the pusher plate 74 overcomes the spring force and allows the plunger to continue its movement towards an aligned stamp bar 28 and to directly contact the head or button 64 of an associated stamping bar 28, thus moving the heated stamping bar into operative contact with the thermal tape and sidewall to effect indicia transfer. In other words, the selected stamping bar 28 clamps the tape 22 to the sidewall and transfers a mark to the sidewall that is configured in accordance with the shape defined by the confronting end 28a of the stamping bar 28.

Figure 8:
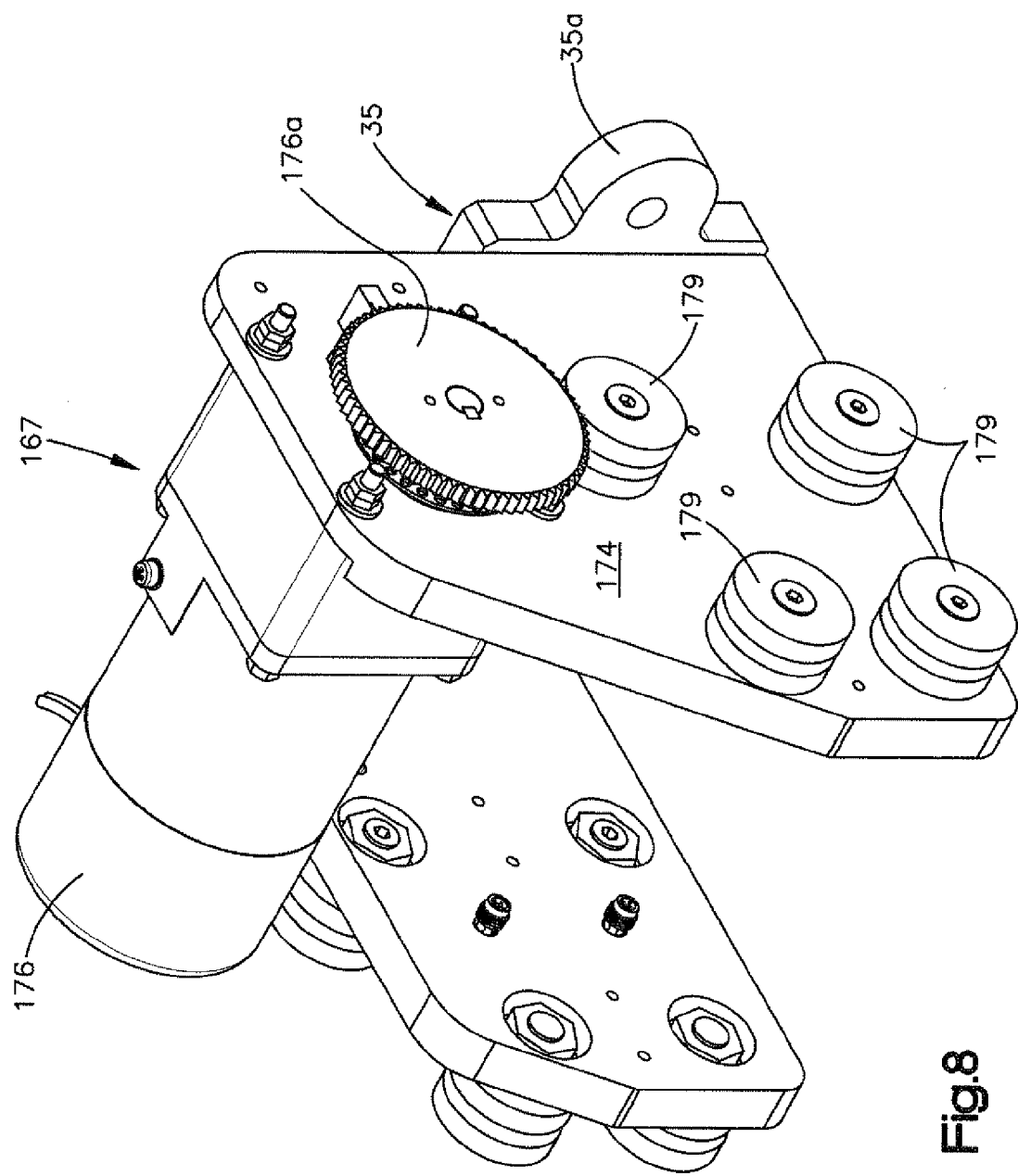
FIG. 8 is a perspective view of a head assembly tilt mechanism constructed in accordance with a preferred embodiment of the invention.

Referring, in particular, to FIGS. 2A, 2B and 8, the tilt mechanism 32 is illustrated which is used to position the marking head 10 with respect to the sidewall of the tire. The tilt mechanism includes a pair of curved tracks 33a, 33b that are attached to the fixed frame 36 by the brackets 37 and a drive module 167. The track 33a includes a gear segment 166. The drive module 167 including a housing 174 mounting a drive motor 176 having a drive gear 176a. The drive gear 176a engages the gear segment 166 on the track 33b. A plurality of idler gears/wheels 179 couple the drive module 167 to the tracks 33a, 33b. The drive module 167 is attached to a suitable bracket or arm (not shown) via the ears 35a. Energization of the drive motor 176 causes the head assembly 10 to tilt with respect to the tire sidewall. The center point of rotation for the head assembly is preferably located at the center of the marking window 20. This allows the tilt angle to be changed without changing the location of the mark with respect to the tire.

Figure 9A:
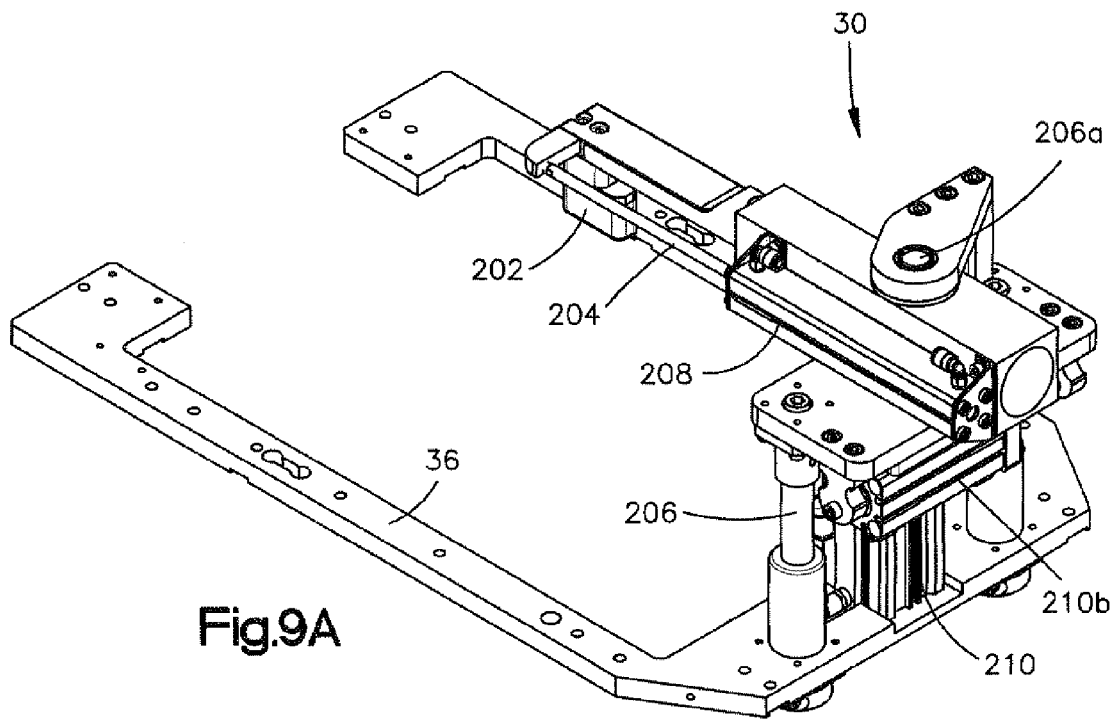
FIG. 9A is a perspective view of a back-up clamp mechanism forming part of the present invention; and, FIG. 9B is a fragmentary side elevational view of the clamp mechanism shown in FIG. 9A.
Figure 9B:
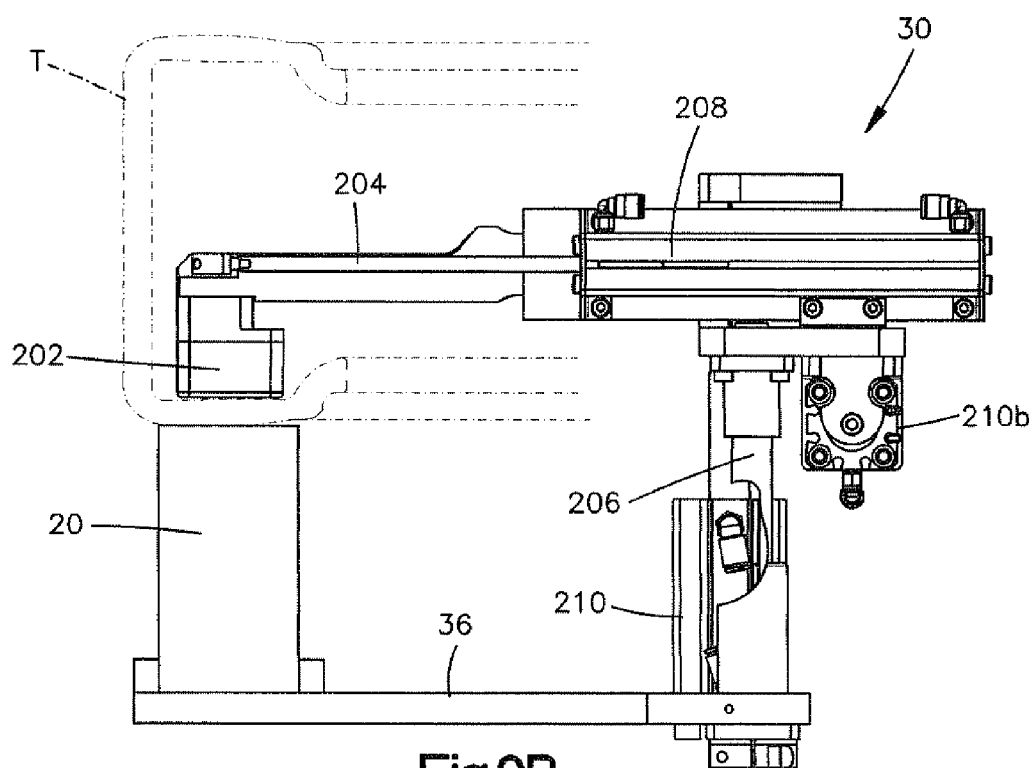

Referring to FIGS. 9A-9B, the details of the back-up clamp mechanism 30 for clamping the sidewall of a tire to the window 20 is illustrated. The clamp includes a clamping pad 202 operatively attached to an extendible rod 204. The struts 206 are rigidly connected to the fixed frame (the same frame to which the window 20' is attached).

In the construction shown in FIG. 9A, a fluid pressure operated actuator 208 is used to advance and retract the rod 204, which carries the back up pad 202. The actuator 210 and pivot arms 206 shown in FIGS. 10A and 10B are replaced by A combination of two actuators 210a and 210b is used to move the pad 202 into the inside of a tire and position in alignment with the window 20 which is located out side the tire. The actuator 210*b* rotates the assembly about a pivot indicated by the reference character 206*a*. The actuator 210*a* then advances the backup clamp assembly to position the back up pad 202 into position inside the sidewall of a tire in alignment with the window 2'. The clamp assembly 30 is supported for reciprocating movement towards and away from its back-up position by guide rods 206.

Referring also to FIG. 9B, the operation of the clamp 30 will be explained. Prior to a time when a tire T is moved into the marking location by a conveyor (not shown), the actuator 208 is retracted in order to move the extendable rod 204 to its retracted position. The actuator 210*b* is actuated to rotate the clamp assembly counterclockwise, (as viewed in FIG. 9A to its position shown in FIG. 1A.). The actuator 210 is retracted in order to lower (as viewed in FIG. 9A) the clamp assembly so that is below the level of a conveyor conveying the tire. The tire then moves into position and the actuators 208, 210*b* and 210*a* are suitably actuated to move the clamp assembly to the position shown in 9B at which the tire sidewall is clamped between the window 20 and the back-up pad 202. The marking head is then actuated to print the desired indicia on the tire sidewall as described above.

It should be noted here that in the illustrated embodiment, the marking assembly is shown below a tire to be marked. In this position, the head assembly 10 is moved upwardly towards the tire to be marked from below a conveyor. Those skilled in the art will recognize that a marking assembly may be mounted above a tire and moved downwardly toward the sidewall of the tire in order to mark the tire. It should also be noted that for some applications a pair of head assemblies may be provided in order to mark both the upper and lower sidewalls (as viewed in FIG. 9B) of a tire. In this configuration each head assembly 10 can place two marks on a sidewall of a tire and thus four marks can be placed on a tire during a single marking cycle.

In the preferred operation, when a tire is to be marked, the head assembly 10 is advanced toward the sidewall of the tire until contact is made between the window 20 and the sidewall of the tire. Referring to FIG. 10 in the preferred embodiment, contact by the window with the sidewall of the tire is detected by a sensing mechanism indicated generally by the reference character 220. In particular, a spring-loaded plunger 222 is biased upwardly (as viewed in FIG. 1C) by a spring 223 is slidably carried the fixed plate 36 and is abutably engageable with a lower edge 20*b* of the window 20. The end of the window structure or frame 20 shown in FIG. 1C is loosely held in a yoke 224 by a removable pin 22*b*. When the window frame 20 contacts the sidewall of the tire, it moves downwardly (as viewed in FIG. 1C), thus causing downward movement in the plunger 222, which in turn, produces movement in a target 228 which is detected by a proximity switch 230. The signal generated by the proximity switch when the plunger is depressed stops further movement of the head assembly toward the sidewall of the tire.

As should be apparent, the present invention provides a highly flexible tire marking apparatus. By providing six different stamping shapes, four (4) different colors and a printing region having either two or more printing positions, a plurality of marks can be applied to the sidewall of the tire to indicate various conditions. A user of the equipment can create a code list based on indicia colors and indicia shapes to precisely define a grade or condition of a tire after it has been tested.

In the illustrated embodiment, the marking apparatus is capable of placing two adjacent marks on the sidewall of the tire. Those skilled in the art will recognize that additional degrees of movement could be added to the intermediate frame in order to move it to three or more positions. For example, the intermediate frame 38 can be configured so that it can move between two positions in the "Y" direction and two positions in a direction orthogonal to the "Y" direction. With this configuration, the marking apparatus could place four marks in a 2×2 matrix on the sidewall of a tire.

Although the invention has been described with a certain degree of particularity, it should be understood that those skilled in the art can make various changes to it without departing from the spirit or scope of the invention as hereinafter claimed.

The invention claimed is:

1. Apparatus for placing tire quality indicia on a sidewall of a cured tire after the tire has been tested, comprising:
    a) a first frame member coupled to a tilt mechanism by which the orientation of said first frame member is adjusted with respect to a tire;
    b) an intermediate frame member mounted for relative movement with respect to said first frame member, said intermediate frame member movable between two operative positions;
    c) structure carried by said first frame member that is positionable in a predetermined alignment with, a marking region on a one sidewall of a cured tire;
    d) said intermediate frame member mounting a stamping bar assembly having a plurality of stamping elements, said stamping bar assembly mounted for relative linear movement with respect to said intermediate frame such that any one of said plurality of stamping elements can be positioned in predetermined alignment with said marking region on said one sidewall of said tire, said stamping bar assembly having at least three stamping elements defining three indicia;
    e) a sub-frame coupled to said intermediate frame, said sub-frame supporting at least one tape cassette in predetermined alignment with said marking region on said sidewall of said tire, such that tape carried by said tape cassette is positioned between said marking region and an aligned stamping element;
    f) a marking actuator located in predetermined alignment with said marking region such that energization of said actuator causes an actuating element forming part of said actuator to move said aligned stamping element towards said marking region on said cured tire whereby said tape is pressed against said tire marking region in order to transfer tape material from said tape to said one sidewall of said tire in order to place non-integral tire quality indicia defined by at least one of said plurality of stamping elements forming part of said stamping bar assembly, on said tire sidewall; and,
    g) said intermediate frame is shiftable between at least two positions in order to place two adjacent marks in said tire marking region on said one sidewall of said tire.

2. The apparatus of claim 1 further comprising a tire clamping apparatus carried by said first frame, including a back-up element movable into an inside region of a tire in alignment with said structure.

3. The apparatus of claim 2 further comprising a clamping actuator for moving said back-up element into clamping engagement with said tire such that said tire marking region is clamped between said back-up element and said window structure.

4. The apparatus of claim 1 wherein said stamping bar assembly is slidably supported by a track carried by said intermediate frame marker is heated and includes six stamping elements, said stamping bar assembly linearly movable by an associated actuator assembly in order to move any one of said six stamping elements into predetermined alignment with said structure such that any one of said six indicia can be placed on one of said sidewalls of said tire.

5. The apparatus of claim 4 wherein said actuator assembly comprises three serially connected actuators.

6. The apparatus of claim 1 wherein said intermediate frame is shiftable between said at least two positions by at least one actuator.

7. The apparatus of claim 1 wherein said tilt mechanism includes a pair of arcuate tracks attached to said first frame member, at least one of said tracks engaged by a tilt drive motor whereby energization of said drive motor produces angular motion in said window carried by said first frame member.

8. The apparatus of claim 7 wherein said angular motion in said apparatus is about a center point located substantially by the center of a marking window forming part of said structure whereby the angularity of said structure changes but does not translate with respect to said marking region.

9. The apparatus of claim 1 wherein said sub-frame mounts a plurality of tape cassettes, each tape cassette being selectively movable into alignment with said structure by a tape deck actuator which incrementally moves said sub-frame.

10. The apparatus of claim 9 wherein each tape cassette includes a different colored ribbon.

11. The apparatus of claim 9 wherein each tape cassette includes a fixed mounting plate attached to said sub-frame and a movable portion which includes tape guides for supporting a tape segment between an aligned stamping element and said structure, said movable tape cassette portion operable to advance said tape segment toward said tire marking region from an initial retracted position, during a printing cycle such that said tape segment is positioned immediately adjacent said region on said tire.

12. The apparatus of claim 11 wherein movement of said movable tape cassette portion causes tape to be pulled from a supply roll forming part of said tape cassette.

13. The apparatus of claim 12 wherein tape is wound onto a take-up spool forming part of said tape cassette when said movable tape cassette portion retracts to its initial position.

14. The apparatus of claim 13 wherein said marking actuator for operating said aligned stamping element also includes a pusher member for advancing said movable tape cassette portion to its position adjacent said marking region.

15. The apparatus of claim 12 further comprising a rotatable spindle for carrying said supply roll, said spindle including a sensor target and said apparatus further comprising a sensor for detecting rotational movement in said target when a tape cassette is positioned in alignment with said structure.

16. The apparatus of claim 15 wherein said target is a slotted wheel and said sensor is mounted to said intermediate frame member.

17. The apparatus of claim 1 further comprising a sensor for sensing movement in said structure whereby contact of said window structure with said tire marking region is detected.

18. Apparatus for marking a one sidewall of a cured tire with preselected non-integral tire quality indicia, comprising:
   a) a frame assembly positionable in predetermined alignment with a tire marking region on a said one sidewall of a cured tire;
   b) said frame assembly mounting a plurality of tape cassettes, each tape cassette selectively movable into a tire marking position for marking one sidewall of a tire with tire quality indicia;
   c) a stamping element positionable in said tire marking position;
   d) an actuator for actuating said stamping element in order to transfer tape material from a tape segment carried by an aligned tape cassette to said one tire sidewall, whereby non-integral tire quality indicia defined by said stamping element is placed on said one tire sidewall;
   e) each tape cassette having a fixed mounting plate and a portion relatively movable with respect to said mounting plate between a retracted position and a tire marking position;
   f) said tape cassette including a tape supply roll and a tape take-up roll, said supply roll and take-up roll having clutch mechanisms so that tape is pulled from said supply roll when said movable portion moves toward said tire marking position;
   g) said tape supply roll further including a sensor target by which rotation of said tape supply roll is monitored by a sensor mounted to said frame assembly.

19. The apparatus of claim 18 wherein said tape supply roll is carried by said fixed mounting plate and includes clutch elements to resist rotation under predetermined operating conditions and said take-up roll is carried by said movable portion and includes a one-way clutch to resist reverse rotation of said take-up spool when tape is being pulled from said supply spool.

20. The apparatus of claim 18 further comprising a stamping bar assembly carrying a plurality of said stamping elements and further including a stamping bar assembly actuator for selectively moving a selected one of said stamping elements into said tire marking position on one sidewall of said tire.

21. The apparatus of claim 18 further comprising a tilt mechanism for adjusting the orientation of said head assembly with respect to the sidewall of a tire.

22. The apparatus of claim 18 further comprising a clamp assembly for clamping a tire marking region of the sidewall of the tire between a back-up element and a tire marking window defined by said frame assembly.

23. The apparatus of claim 18 wherein each of said plurality of tape cassettes includes different colored tape.

24. The apparatus of claim 18 wherein said frame assembly includes an intermediate frame member movable between two positions whereby two adjacent marks can be placed on said one tire sidewall.

25. The apparatus of claim 18 wherein said retracted position is adjustable in order to adjust the amount of tape pulled from said supply roll during movement of said movable portion toward said tire sidewall.

26. A method for marking one sidewall of a cured tire with tire quality indicia after the tire is tested, comprising the steps of:
   a) positioning a marking head assembly in predetermined alignment with the sidewall of the cured tire;
   b) moving a selected one of a plurality of tape cassettes carried by said assembly, into a tire marking position;
   c) linearly moving a selected one of a plurality of stamping elements, carried by said frame assembly, into said tire marking position said frame assembly carrying at least three stamping elements;

d) moving a tape segment carrying portion of said selected tape cassette into abutting proximity with a tire marking region on said tire sidewall;

e) moving said selected stamping element toward said tire marking region in order to transfer material from tape held by said tape segment carrying portion to said one tire sidewall, to thereby mark said one sidewall of the cured tire with non-integral tire quality indicia defined by said stamping element;

f) retracting said stamping element and tape segment carrying portion.

27. The method of claim 26 further comprising the step of shifting said aligned tape cassette and said aligned stamping element to a second position and moving said tape segment and said stamping element to place a second mark, adjacent said first mark, on said one tire sidewall.

28. The method of claim 27 further comprising the step of pulling fresh tape from said tape supply roll as said tape segment carrying portion is moved toward said tire, while inhibiting rotation of said take-up spool.

29. The method of claim 28 further comprising the step of monitoring rotation of said tape supply roll to determine an occurrence of tape breakage or supply depletion.

30. The method of claim 26 further comprising the step of monitoring movement in a marking structure forming part of said frame assembly in order to detect when said marking structure is in contact with said one tire sidewall.

31. The method of claim 26 wherein said step of moving a selected one of said tape cassettes into said tire marking position is achieved by selectively actuating one or more of a plurality of serially connected actuators.

32. The method of claim 26 wherein said step of moving a selected one of said stamping bar elements into said tire marking position is achieved by selectively actuating one or more of a plurality of serially connected actuators.

33. The method of claim 26 further comprising the step of heating said stamping elements.

34. The apparatus of claim 1 wherein said structure comprises a window structure.

* * * * *